Figure 5:
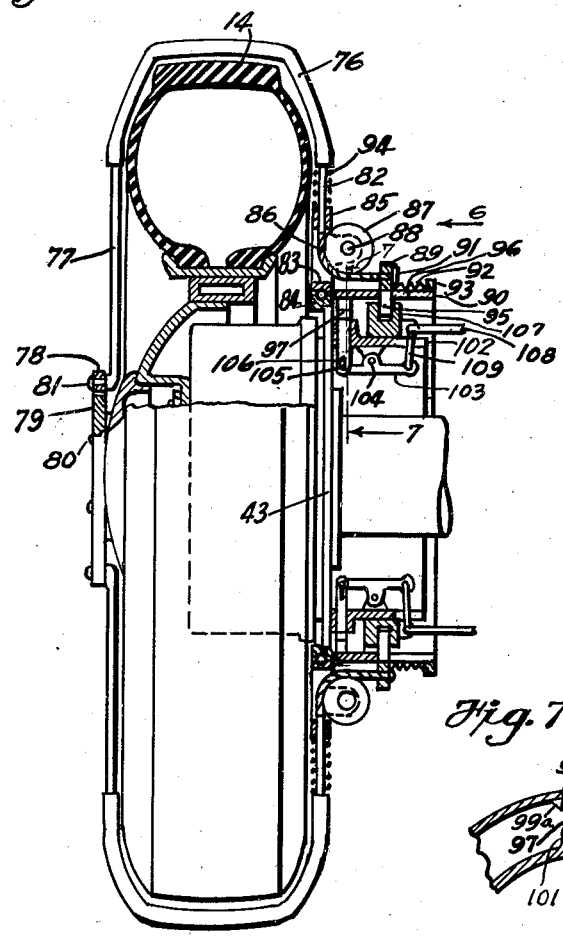

April 2, 1940.　　　　F. J. DALEY　　　　2,195,982
ANTISKID DEVICE
Original Filed Jan. 17, 1938　　2 Sheets-Sheet 1
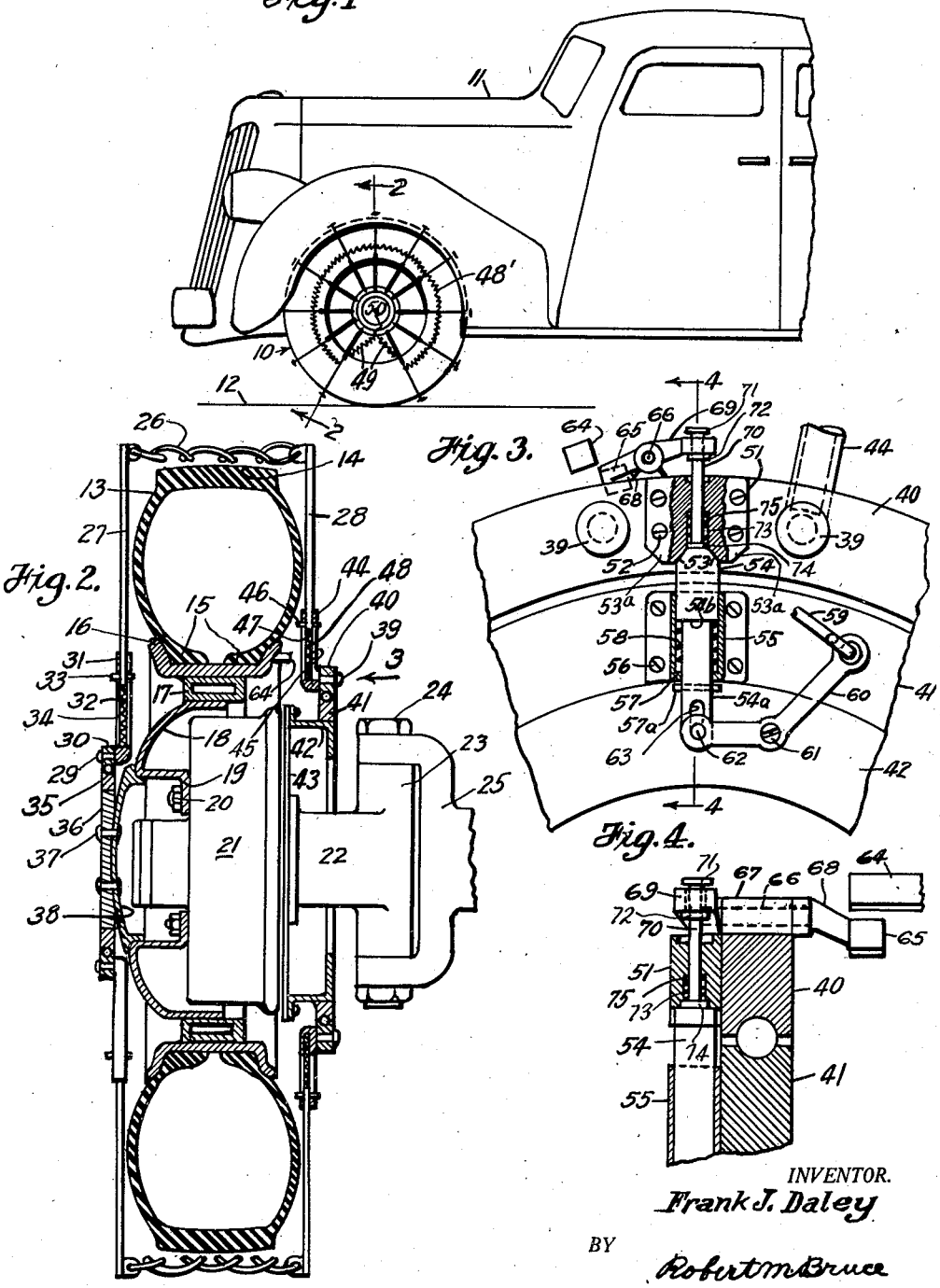
INVENTOR.
Frank J. Daley
BY Robert M Bruce
ATTORNEY.

April 2, 1940.   F. J. DALEY   2,195,982
ANTISKID DEVICE
Original Filed Jan. 17, 1938   2 Sheets-Sheet 2

INVENTOR.
Frank J. Daley
BY
Robert M. Bruce
ATTORNEY.

Patented Apr. 2, 1940

2,195,982

UNITED STATES PATENT OFFICE 2,195,982

ANTISKID DEVICE

Frank J. Daley, Schenectady County, N. Y.

Application January 17, 1938, Serial No. 185,263
Renewed February 2, 1940

10 Claims. (Cl. 152—216)

My invention relates to antiskid devices.

Vehicles, such as automobiles are frequently required to operate under slippery road conditions due to mud, ice, snow and the like. The traction of the vehicle on the road becomes so poor that the vehicle may become stalled, and the automobile may skid laterally on the road and become uncontrollable. This loss of traction and skidding is minimized by attaching chains or other similar antiskid devices to the tread of the wheel.

These devices are very unsatisfactory because of the great inconvenience involved in changing them. If they are attached to the wheels the operator cannot readily remove them without reaching around the wheels to release the inside connection. The connection also is usually hard to release as it becomes fouled with ice or mud. As a result operators usually leave their chains on for considerable distances in which they traverse clear roads and short stretches of roads requiring chains. Traveling on clear roads greatly wears chains. If the operator encounters a stretch of road requiring chains or similar antiskid devices, and they are not on the automobile, conditions are most unfavorable for putting them on the wheels.

An object of my invention is to provide an improved antiskid or traction increasing arrangement for vehicles in which the device can be carried by the vehicle when not in use so that the wheel or the like can be run with the exposed tread of the wheel in contact with the surface of the road, and in which the traction increasing arrangement can be brought into operative relation to the wheel when it is required to traverse a road requiring increased adhesion between the wheel and the road.

A further object of my invention is to provide an improved antiskid or traction increasing arrangement for vehicles in which the arrangement can be carried adjacent the wheel of the vehicle when not in use, so that the wheel or the like can be run with the exposed tread of the wheel in contact with the surface of the road, and in which the traction increasing arrangement can be brought into driving relations with the wheel or secured tightly about the tread of the wheel when it is required to traverse a road requiring increased adhesion between the wheel and the road.

A further object of my invention is to provide an improved antiskid or traction increasing arrangement for vehicles in which the device can be rendered ineffective, as desired in traversing clear roads with the tread of the wheels exposed to the surface of the road, and in which the device can be rendered effective, as required in traversing slippery roads, from the vehicle and preferably from the operator's seat.

Further objects and advantages of my invention will become apparent as the following description proceeds, and the features of novelty which characterize my invention will be set forth in the claims annexed to and forming a part of this specification.

Figure 6:
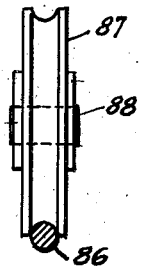
Figure 7:
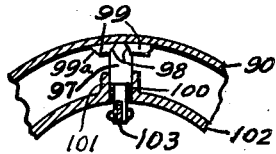

On the accompanying drawings, Fig. 1 is a fragmentary side elevation of an automobile having an antiskid device on the front wheel thereof embodying my invention; Fig. 2 is a sectional view of the wheel and antiskid device on the line 2—2 of Fig. 1; Fig. 3 is a fragmentary view in the direction indicated by the arrow 3 in Fig. 2 showing the release and driving arrangement used in the construction shown in Figs. 1 and 2; Fig. 4 is a fragmentary sectional view of the line 4—4 of Fig. 3; Fig. 5 is an elevational view partly in section viewing the tread of the wheel and illustrating a modification of my invention in which the antiskid device remains stationary permitting free running of the wheel or is gripped on the wheel tread to run therewith; Fig. 6 is a fragmentary view indicated by arrow 6 in Fig. 5; and Fig. 7 is an enlarged sectional view on line 7—7 of Fig. 5.

Referring to the drawings, in the form of my invention illustrated in Figs. 1 to 4 inclusive each of the wheels 10 of the automobile 11 are provided with an antiskid device arranged about the tread of the wheels and retained during smooth road operation so that the exposed tread of the wheel can run freely over the road 12 while the antiskid devices are retained by latch or the like so that they do not rotate with the wheels and permit the wheels to rotate freely with respect thereto. Although the detailed construction of the front wheel is shown, it will be understood that the rear wheels of the automobile are provided with a similar arrangement.

The wheel 10 includes a pneumatic tire 13 having a tread 14 and beads 15 mounted on a rim 16. The rim 16 is provided with a felly 17 rigidly mounted on a central wheel portion 18 which is flanged at 19 to secure the wheel portion by bolts 20 to a brake drum 21 which is rotatably mounted in the usual manner on a spindle 22 attached to the steering knuckle 23 pivotally attached by king bolt 24 to the front axle 25 of the automobile.

The antiskid device or traction increasing arrangement includes a plurality of chains 26 arranged in spaced relation about the periphery of the tread 14 and the wheel and out of contact with the tread so that the wheel can run freely with respect thereto. The chains 26 are spaced apart on opposite sides of the arc of contact between the wheel tread and the surface of the road 12 as shown in Fig. 1, so that there is no tendency of rotation of the wheel to carry the chains 26 over the arc of contact. The chains 26 may be made in any suitable manner, and may be imbedded in vulcanized rubber or constructed of other suitable material which will give the desired increase in adhesion between the wheel and the surface of the road when desired. The chains 26 are spaced apart about the remaining periphery of the wheel above the arc of contact, but are preferably evenly spaced apart and close enough together to obtain satisfactory non-skid operation when the condition of the road requires the use of the device.

The chains 26 are attached at their opposite ends to supporting elements or arms 27 and 28 respectively arranged radially of the wheel, eleven such arms are provided on each side of the wheel in alignment with each other axially of the wheel, thus leaving exposed the arc of contact between the wheel and the surface of the road. The arms 27 are pivotally attached at 29 to the outer race 30 of a ball bearing. In order to make the arms 27 radially resilient they are mounted in sleeves 31 and are urged outwardly by springs 32 which are retained under compression between the inner ends of the arms 27 and the closed ends of the sleeves 31 adjacent the pivotal connection 29. The outward movement of the arms 27 is limited by pins 33 attached to the arms which are slidably arranged in slots 34 in the sides of the sleeves 31. The inner race 35 cooperating with the outer race 30 of the ball bearing, is attached to a mounting plate 36 riveted at 37 to the hub cap 38 of the wheel 10. Thus the wheel is free to rotate with respect to the arms 27 but the ball bearing retains the arms 27 and the desired relation to the wheel. The arms 28 are also pivoted at 39 to the outer race 40 of a ball bearing which cooperates with an inner race 41 secured to a stationary flange 42 mounted on a disk 43 carrying the stationary part of the brake cooperating with the brake drum 21. The inner ends of the arms 28 are slidably mounted in sleeves 44 which are attached at their inner ends to the pivotal supports 39. The arms 28 are made axially resilient by compression springs 45 retained under compression in the sleeve 44 between the inner ends of the arms 28 and the closed ends of the sleeve 44 adjacent the pivotal connections 39. The outward movement of the arms 28 is limited by pins 46 attached to the arms 28 and slidably movable in slots 47 in opposite sides of the sleeve. Thus the resilient arms 27 and 28 support the chains 26 out of contact with the tread 14 of the tire. The arms 27 and 28 are arranged radially of the wheel, and are retained in this relation by a plurality of tension springs 48'. The arms on opposite sides of the arc of contact of the wheel are retained in radial relation by springs 49 connected at 50 to the outer race of the supporting ball bearing, and the springs 48' connecting together the other adjacent arms.

The arms 27 and 28 are latched in the position shown in Fig. 1 by an arrangement shown in Figs. 3 and 4. This latching arrangement includes a block 51 attached to the outer race 40 by screws 52, and having inclined faces 53 presented radially inward so as to cooperate with a latch bolt 54 having faces conforming to the faces 53. The latch bolt 54 is guided radially by a casing 55 in which it is slidably fitted, the casing being attached to the inner stationary race 41 by screws 56. The casing is flanged at 57 to slidably fit a reduced portion 54a of the latch bolt, and a compression coil spring 58 is retained under compression between the flange 57 and the shoulder 54b on the latch bolt. With this arrangement the latch bolt 54 is retained by the spring 58 in engagement with the faces 53, so as to prevent the rotation of the outer race 40 with respect to the stationary race 41. This also prevents rotation of the arms 27 and 28 as well as the outer race 30 to which the arms 27 are attached. If the automobile should encounter an obstruction in the road some of the chains 26 may be forced into contact with the tread 14 and carried around with the wheel. When this occurs the tapered wedge face 53 exerts a wedging downward force on the latch bolt 54 and forces it downwardly to compress the spring 58 until the end of the latch bolt slides under the lower end of the block 51. During this rotation of the outer race 40 the latch bolt 54 is limited in its outward movement by pin 57a which engages the flange 57, so as not to come into engagement with the pivotal connections 39. When the wheel is returned to the position shown in Fig. 1, and the wheel is running over a smooth portion of the road again the tapered outer end of the latch bolt 54 will engage the tapered outer lower surface 53a of the block 51 and be pressed downwardly and snapped into engagement with the faces 53 so as to latch the outer race 40 the arms 27 and 28 and outer race 30 in the position shown in Fig. 1.

When the operator desires to bring the chains 26 into operative relation with the tread 14 a pull rod 59 is actuated from the operator's seat on the vehicle. This swings a link 60 about its pivotal support 61 carried by the stationary support 42 and retracts the latch bolt 54 so as to disengage and clear the latch block 51 through the pivotal connection 62 of the link 60 to the lower end of the latch bolt 54. The pivotal connection 62 is slidably arranged in a slot 63 in the lower end of the latch bolt, so that the latch bolt 54 can be snapped out of engagement with the block 51 without transmitting any motion to the link 60. Operation of the pull rod 59 to retract the latch bolt 54 to release the outer race 40 permits turning of the arms 27 and 28 with the wheel 10, so that the chains 26 are successively carried about the arc of contact between the tread and the surface of the road. The arms 27 and 28 are mechanically driven or coupled so as to rotate with the wheel in this way by providing a projection 64 on the rim 16. The projection 64 is preferably square and under this condition engages a square block 65 which engages one side or the other of the block 64 depending on the direction of rotation of the wheel 10. This block 65 is shown in its disengaged position in Fig. 3, but is pivotally mounted on a pin 66 carried by a bearing 67 attached to the outer race 40, the block 65 being attached to the pin 66 by an arm 68 rigidly carried by the pin 66. The opposite end of the pin 66 provided with an arm 69 receiving a headed shaft 70 which is slidably mounted in an opening in alignment with the axis of the latch bolt 54.

The shaft 70 is loosely fitted in an opening in the end of the arm 69 smaller than the head 71 and the collar 72 on the shaft 70. A counterbore 73 is formed in the block 51 about the lower end of the shaft 70 to slidably receive a head 74 retaining a helical compression spring 75 in the counterbore. In the position illustrated in Fig. 3 the latch bolt 54 is in its latching position and the spring 58 pushes the shaft 70 upwardly to compress the relatively weak spring 75, thus swinging the block 65 into the position shown and out of engagement with the projection 64 carried by the wheel rim, thus the block 65 does not come into driving engagement with the block 64. When the latch bolt 54 is retracted by the pull rod 59 to release the block 51, the spring 75 lowers the shaft 70 and swings the block 65 into the path of movement of block 64 so that the blocks engage, and the outer race 40 together with the arms 27 and 28 are driven through these blocks so as to cause the chains 26 to be rotated with the wheel 10, and prevent skidding of the automobile. When the antiskid device is no longer required the pull rod 59 is released from the operator's seat so that the latch bolt 54 snaps into engagement with the faces 53 to stop rotation of the outer race 40 together with the arms 27 and 28 with these arms in the position shown in Fig. 1 of the drawings, with the exposed tread of the wheel running in contact with the surface of the road.

A modification of my invention is illustrated in Figs. 5, 6, and 7 of the drawings, in which the antiskid device is arranged about the wheel and latched in a stationary position as shown in Fig. 1 of the drawings when it is desired to traverse a clear stretch of road not requiring the antiskid device. In this form of my invention the antiskid device is brought into operation by clamping the elements extending across the tread of the wheel in firm driving engagement therewith and again released when not required. This engagement and disengagement is preferably done by actuation of a pull rod conveniently accessible from the operator's seat. In the construction illustrated the wheel 10 is of the same construction as that shown in Fig. 2 and corresponding parts have been designated by the same reference numerals. The antiskid device comprises a plurality of relatively rigid molded reinforced elements 76 extending across the tread 14 of the wheel but out of contact therewith so that the wheel can run freely in respect thereto. These elements 76 are arranged about the periphery in the same relation as the chains 26 shown in Figs. 1 and 2, and are retained in the desired relation by a similar set of springs 48' and 49 as that used in connection with the arms 27 and 28. The outer ends of the elements 76 are pivotally connected by supporting elements or arms 77 to the outer race 78 a ball bearing, the inner race 79 of which is attached to the hub cap of the wheel by rivets 80. The pivotal attachment of the inner ends of the arms 77 to the outer race 78 is indicated at 81. The inner ends of the elements 76 are attached by supporting elements or arms 82 to the outer race 83 of a ball bearing by an arrangement providing for tensioning of the arms 82 to clamp the elements 76 into driving engagement with the wheel. The inner race 84 of the ball bearing is attached to the stationary brake shoe supporting plate 43. This tensioning arrangement includes a guide 85 for each of the arms 82, a flexible cable 86 attached to the inner ends of the arms 82, a roller 87 grooved on its periphery to receive the cable 86 and pivotally mounted on a pin 88 carried by ears extending from the guide 85. The guide 85 and the mounting ears for the roller 87 are rigidly secured to the outer race 83 of the ball bearing. The end of the cable is extended about the roller 87 axially of the wheel 10 and through openings in a ring 89 slidably mounted on a cylindrical extension 90 which is rigidly secured to the outer race 83 of the ball bearing. The outer ends of the cable 86 are headed at 91 to securely attach them to the adjusting ring 89. The adjusting ring 89 is urged toward the ball bearing 83 and the position shown in Fig. 5 by a series of resilient coil compression springs 92 which are retained under compression between the adjusting ring 89 and a retaining collar 93 threaded on the exterior of the extension 90. In order to avoid any slack in the cable 86 the element 76 is urged outwardly away from the guide 85, by resilient compression spring 94 arranged about the arm 82. In order to move the ring 89 against the compression springs 92 so as to clamp the element 76 in engagement with the tread of the wheel, I provide fingers 95 on the ring 89 extending radially inward through axial slots 96 in the cylindrical extension 90. The axial slots 96 extend from the ring 89 to the end of the extension 90, and are made long enough to ensure sufficient axial movement of the ring 89 against the springs 92 to clamp the elements 76 securely in driving engagement with the tread of the wheel. When the ring 89 is in the position shown in Fig. 5 the spring 94 retains the element 76 out of contact with the wheel and the element 76 remains stationary. The desired relation of the elements 76 and their associated arms 77 and 82 are maintained by springs like the springs 48' and 49 shown in Fig. 1. The arc of contact of the tread 14 of the wheel in contact with the ground will provide for free running of the wheel over the surface of the road. The outer race 83 together with the outer race 78 and the arms 77 and 82 which are connected by the elements 76 are retained in this stationary position, corresponding to that shown in Fig. 1 of the drawings, by a latch bolt 97 engaging a notch 98 and a block 99 carried by the cylindrical extension 90 and rigidly secured thereto. The latch bolt is retained in engagement with the notch 98 by spring 100. If the wheel encounters an obstruction one of the elements 76 may be forced into engagement with the wheel and carried under the arc of contact between the tread of the wheel and the surface of the road. If this occurs, the tapered surfaces 96 will snap the latch bolt 97 out of engagement with the notch 98, but the rotation of the wheel to its initial position will snap the latch bolt over the tapered outer side 99a of the blocks 99 and into engagement with the notch 98, and again retain the elements 76 in the position shown in Fig. 1 of the drawings, with the wheel running freely with respect to these elements. The latch bolt 97 is slidably mounted and a guide 101 formed in the inner end of a cylindrical guide ring 102. The latch bolt may be operated by a lever 103 which is pivoted at 104 on a boss carried by the inside of the guide ring 102. One end of this lever is pivotally connected at 105, the pivot pin being vertically movable in a slot 106 in the lower end of the latch bolt 97. Thus the latch bolt 97 can be snapped out of the notch 98 without moving the lever 103.

When it is desired to clamp the element 76 into clamping engagement with the tread 14 of the wheel a thrust ring 107 having an annular slot engaging the fingers 95 is moved to the right by a pull rod 108 which is operated from the operator's seat in the vehicle. This thrust ring 107 is guided by slidingly fitting the same on the guide ring 102. The pull rod 108 is moved sufficiently to cause the cables 86 attached to the ring 89 to clamp the elements 76 against the tread of the wheel. This movement of the thrust ring 107 first releases the latch bolt 97 by the action of a link 109 connecting the thrust ring 107 to the outer end of the lever 103. This movement is continued after releasing the latch bolt until the elements 76 are clamped in engagement with the tread 14 of the wheel. In this way the elements 76 rotate with the wheel and provide against skidding of the vehicle. Under this condition the stationary thrust ring 107 does not interfere with the rotation of the mechanism attached to the elements 76, because the fingers 95 rotate in the grove in the stationary ring 107. If it is then desired to discontinue using the antiskid device, the pull rod 108 is released. The springs 92 first move the ring 89 so as to relieve the tension in the cables 86 and the springs 94 move the elements 76 to a position in which they are out of engagement with the tread of the wheel. Slight further movement of the ring 107 releases the latch bolt 97 so that it engages the notch 98 and retains the elements 76 in the position shown in Fig. 1 of the drawings.

It will be understood that the springs 48' and 49 retain the arms 77 in radial position with respect to the wheel, but in the event of striking an obstruction or upon the occurrence of a flat tire the arms 77 will be free to accommodate themselves to the shifting of the arms that may be required. The ball bearings associated with the races 78 and 83 of Fig. 5 and the races 30 and 40 in Fig. 2 are preferably of the sealed type to exclude dust and retain lubricant therein such as grease or oil.

Although I have illustrated two embodiments of my invention, modifications will occur to those skilled in the art. I do not therefore desire my invention to be limited to the particular constructions disclosed, and I intend in the appended claims to cover all modifications which do not depart from the spirit and scope of my invention.

What I claim as new and desire to secure by Letters Patent of the United States, is:

1. In combination, a vehicle, means including a wheel for translatably supporting said vehicle on a surface, means associated with said supporting means and movable therewith for increasing the traction of said supporting means on the surface over which said vehicle is translatable, and means for arresting said traction increasing means with respect to said supporting means and out of contact with the surface over which said vehicle is translatable, said arresting means being releasable by said wheel upon encountering an obstruction.

2. In combination, a vehicle, means including a wheel for translatably supporting said vehicle on a surface, means secured to said supporting means and movable therewith for increasing the traction of said supporting means on the surface over which said vehicle is translatable, and means including a resiliently biased latching bolt and a latching block, for releasing said traction increasing means from said supporting means and for arresting said traction increasing means with respect to said supporting means and out of contact with the surface over which said vehicle is translatable, said releasing and arresting means being releasable by said wheel upon encountering an obstruction.

3. In combination, a vehicle, means including a wheel having a tread for translatably supporting said vehicle on a surface, means extending about the tread of said wheel and including portions spaced apart a distance greater than the arc of contact between the tread of said wheel and the surface over which said vehicle is translatable for increasing the traction between the tread of said wheel and the surface, and means for arresting said traction increasing means with respect to said wheel in a position in which said portions are disposed on opposite sides of the arc of contact of said tread and the surface to provide running said wheel on the surface with said traction increasing means out of contact with the surface, said arresting means being releasable by said wheel upon encountering an obstruction.

4. In combination, a vehicle, means including a wheel having a tread for translatably supporting said vehicle on a surface, means extending about the tread of said wheel and including portions spaced apart a distance greater than the arc of contact between the tread of said wheel and the surface over which said vehicle is translatable for increasing the traction between the tread of said wheel and the surface, means for rotatably supporting said traction increasing means out of driving engagement with said wheel and with respect thereto, a latching block having tapered wedge latching faces associated with said rotatable supporting means, and means including a latching bolt having tapered wedge faces adapted to cooperate with said latching block; for arresting said traction increasing means with respect to said wheel in a position in which said portions are disposed on opposite sides of the arc of contact of said tread and the surface to provide running said wheel on the surface with said traction increasing means out of contact with the surface.

5. In combination, a vehicle, means including a wheel having a tread for translatably supporting said vehicle on a surface, means extending about the tread of said wheel for increasing the traction between the tread of said wheel and the surface, means including arms for carrying said last mentioned means rotatably with respect to said wheel and out of driving engagement therewith, and means controllable from said vehicle for arresting rotation of said arms with respect to said wheel, said arresting means being releasable by said wheel upon encountering an obstruction.

6. In combination, a vehicle, means including a wheel having a tread for translatably supporting said vehicle on a surface, means extending about the tread of said wheel for increasing the traction between the tread of said wheel and the surface, means including resilient supporting elements for carrying said last mentioned means rotatably with respect to said wheel and for biasing said last mentioned means out of driving engagement therewith, and means for arresting rotation of said supporting elements with respect to said wheel and providing for rotation of said traction increasing means with said wheel, said arresting means being releasable on said traction increasing means encountering an obstruction to provide for rotation of said traction increasing means with said wheel.

7. In combination, a vehicle, means including a wheel having a tread for translatably supporting said vehicle on a surface, means extending about the tread of said wheel for increasing the traction between the tread of said wheel and the surface, means including radially resilient supporting elements for carrying said last mentioned means rotatably with respect to said wheel and for biasing said last mentioned means out of driving engagement therewith, and means for arresting rotation of said supporting elements with respect to said wheel and for rotating said supporting elements with said wheel, said arresting means being releasable on said traction increasing means encountering an obstruction to provide for rotation of said traction increasing means with said wheel and being arranged to arrest rotation of said traction increasing means when disengaged from such obstruction.

8. In combination, a vehicle, means including a wheel having a tread for supporting said vehicle on a surface, means extending about the tread of said wheel for increasing the traction between the tread and the surface, means for supporting said traction increasing means out of driving engagement with said wheel, said supporting means being releasable upon said traction increasing means encountering an obstruction to provide for rotation of said traction increasing means with said wheel, and means movable axially of said wheel for securing said traction increasing means in driving engagement with the tread of said wheel and for biasing said traction increasing means support to disengaged position.

9. In combination, a vehicle, means including a wheel having a tread for supporting said vehicle on a surface, means extending about the tread of said wheel for increasing the traction between the tread and the surface, means for supporting said traction increasing means out of driving engagement with said wheel, said supporting means being releasable upon said traction increasing means encountering an obstruction to provide for rotation of said traction increasing means with said wheel and arranged to arrest rotation of said traction increasing means when disengaged from such obstruction, and means operable from said vehicle and movable axially of said wheel for securing said traction increasing means in driving engagement with the tread of said wheel and for biasing said traction increasing means support to disengaged position.

10. In combination, a vehicle, means including a wheel having a tread for supporting said vehicle on a surface, means extending about the tread of said wheel for increasing the traction between the tread of said wheel and the surface, means arranged on one side of said wheel and extending radially thereof for rotatably supporting one side of said traction increasing means, means arranged on the other side of said wheel and extending radially thereof for rotatably supporting the other side of said traction increasing means out of driving engagement with said tread, and means on one of said wheel sides for securing said traction increasing means in driving engagement with the tread of said wheel.

FRANK J. DALEY.